United States Patent [19]
Bruckert et al.

[11] Patent Number: 5,894,500
[45] Date of Patent: Apr. 13, 1999

[54] METHOD AND APPARATUS FOR CANCELING SIGNALS IN A SPREAD-SPECTRUM COMMUNICATION SYSTEM

[75] Inventors: Eugene J. Bruckert, Arlington Heights; Michael D. Kotzin, Buffalo Grove, both of Ill.

[73] Assignee: Motorola, Inc., Schaumburg, Ill.

[21] Appl. No.: 08/874,709

[22] Filed: Jun. 13, 1997

[51] Int. Cl.[6] .................................... H03D 1/04
[52] U.S. Cl. ...................... 375/346; 375/346; 375/200; 370/335
[58] Field of Search .................... 375/200, 335, 375/206, 208; 359/161; 370/479, 342, 201, 335; 379/410, 390, 406

[56] References Cited

U.S. PATENT DOCUMENTS

| | | | |
|---|---|---|---|
| 5,553,062 | 9/1996 | Schilling et al. | 370/18 |
| 5,596,439 | 1/1997 | Dankberg et al. | 359/479 |
| 5,671,247 | 9/1997 | Souissi et al. | 375/200 |
| 5,740,208 | 4/1998 | Hulbert et al. | |
| 5,787,130 | 7/1998 | Kotzin et al. | 375/346 |

FOREIGN PATENT DOCUMENTS

WO 95/26593  10/1995  WIPO.

*Primary Examiner*—Stephen Chin
*Assistant Examiner*—Shuwang Liu
*Attorney, Agent, or Firm*—Kenneth A. Haas

[57] ABSTRACT

A subscriber's signal (117) is removed from a composite signal (120) received in a serving base station (100), where the subscriber (113) is not in communication with the serving base station (100). The subscriber's signal (117) is removed from the composite signal (120) by receiving information regarding potential interferers in communication with the non-serving base stations (150). Next, a most reliable signal is determined from the potential interferers in communication with non-serving base stations (150–155). The most reliable signal is then removed from the composite signal (120).

14 Claims, 4 Drawing Sheets

METHOD AND APPARATUS FOR CANCELING SIGNALS IN A SPREAD-SPECTRUM COMMUNICATION SYSTEM

FIELD OF THE INVENTION

The present invention generally relates to canceling interference in signals in a communication system, and more particularly to a method and apparatus for canceling signals generated in non-serving cell sites.

BACKGROUND OF THE INVENTION

In a communication system such as a direct sequence spreadspectrum code division multiple access (DS-CDMA) system, a received signal at a base station comprises a multiplicity of frequency and time overlapping coded signals from individual remote units each of which has undergone multipath scattering. Each of these signals is transmitted simultaneously at the same radio frequency (RF) and is distinguishable only by its specific encoding. In other words, the uplink signal received at a base-station receiver is a composite signal of each transmitted signal and an individual remote unit's signal is distinguishable only after decoding.

In conventional DS-CDMA systems, the receiver decodes each remote unit separately by applying each respective remote unit's code to the composite received signal. Each individual remote unit's signal is thereby "despread" from the composite received signal. Due to the nature of the family of codes utilized, the other remote units' signals remain in a spread form and act only to degrade the recovered signal as uncorrelated interference.

Prior art techniques of interference cancellation are known to reduce even uncorrelated interference. This permits an increase in the sensitivity and or capacity of the multi-remote unit system. The most common technique of interference cancellation is to synthesize a replica of a particular remote unit's received signal, after it has been properly decoded, and utilize the synthesized replica to cancel interference (by subtraction) from the received signal. Such a prior-art method of interference cancellation is described in US Patent "Method and Apparatus for Canceling Spread-Spectrum Noise" by Stilwell et. al., (U.S. Pat. No. 5,235,612) assigned to the assignee of the present invention, and incorporated herein by reference. Because serving base stations utilizing prior-art techniques of interference cancellation synthesize a replica of a particular signal only after it has been properly decoded, the serving base stations can only eliminate interference from signals of remote units actually in communication with the serving base stations (i.e., within the serving base station's coverage area). Therefore, by utilizing such prior-art techniques, it is possible for serving base stations to effectively eliminate a remote unit's signal from the composite received signal only if the remote unit happens to be in communication with the serving base station.

In a cellular environment, remote units in communication with nonserving base stations and not communicating with the serving base station contribute as much as half the noise energy to a serving base station. Therefore, prior-art techniques of interference cancellation are deficient in that they fail to eliminate any interference of remote unit's communicating with non-serving base stations and not in communication with the serving base station. Therefore, a need exists for a method and apparatus for canceling interference of signals generated in non-serving cell sites.

DETAILED DESCRIPTION OF A PREFERRED EMBODIMENT

Stated generally, a subscriber's signal is removed from a composite signal received in a serving base station, where the subscriber is not in communication with the serving base station. The subscriber's signal is removed from the composite signal by receiving information regarding potential interferers in communication with the non-serving base stations. Next, a most reliable signal is determined from the potential interferers in communication with non-serving base stations. The most reliable signal is then removed from the composite signal.

The present invention encompasses a method of canceling noise in a spread-spectrum communication system. The method comprises the steps of receiving a composite signal having a multiplicity of frequency and time overlapping coded signals from remote units in communication with a serving base station and having interference caused by a signal from a remote unit not in communication with the serving base station. Information is received from other non-serving base stations regarding the interference, and a cancellation signal representative of the interference is produced based on the information received. Finally, a composite signal is produced substantially free from the interference.

The present invention additionally encompasses a method of canceling signals in a spread-spectrum communication system. The method comprises the steps of receiving a composite signal having a multiplicity of frequency and time overlapping coded signals from remote units in communication with a serving base station, the composite signal additionally having signals from remote units not in communication with the serving base station. Information is obtained from non-serving base stations regarding the signals from the remote units not in communication with the serving base station and a cancellation signal is produced representative of the signals transmitted from the remote units not in communication with the serving base station. Finally a signal is produced substantially free of the signals transmitted by the remote units not in communication with the serving base station.

Finally, the present invention encompasses an apparatus comprising a noise canceling unit having as an input a composite signal comprising a multiplicity of frequency and time overlapping coded signals from remote units in communication with a serving base station, the composite signal additionally having a signal from a remote unit not in communication with the serving base station, the noise canceling unit additionally having as an input information from a non-serving base station regarding the signal from the remote unit not in communication with the serving base station and outputting composite signal substantially free of the signal transmitted from the remote unit not in communication with the serving base station.

Figure 1:
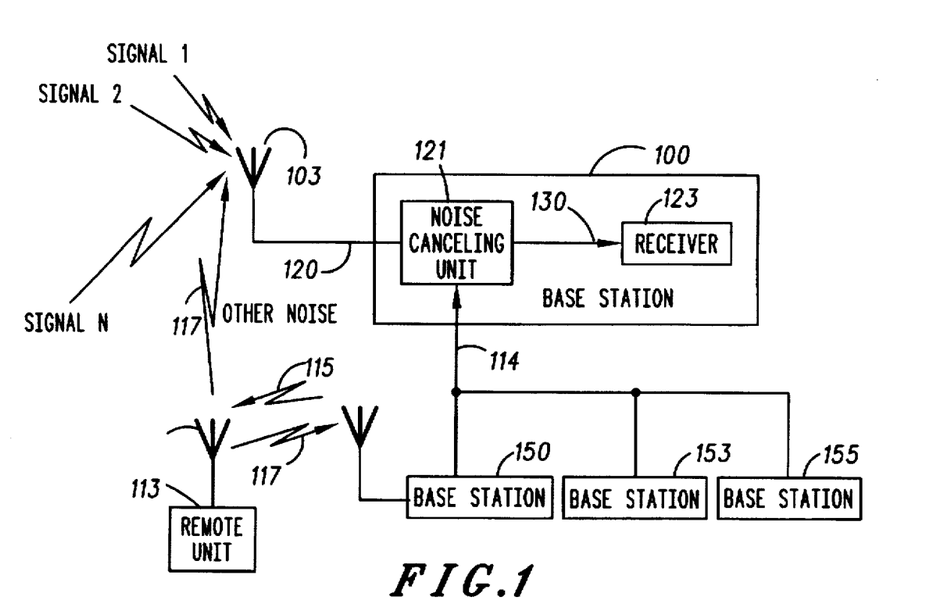
FIG. 1 generally depicts, in block diagram form, a base station which may beneficially implement interference cancellation in accordance with the invention.

FIG. 1 generally depicts, in block diagram form, base station 100 which may beneficially implement interference cancellation in accordance with the invention. In the preferred embodiment of the present invention base station 100 is a cellular base station such as a Motorola SC9600 CDMA base station utilized in spread-spectrum communication systems. As shown, base station 100 comprises, noise canceling unit 121, and receiver 123. Receiver 123 is a spread spectrum receiver such as described in the Electronic Industry Association/Telecommunications Industry Association Interim Standard 95A (TIA/EIA/IS-95A), incorporated by reference herein. (TIA/EIA can be contacted at 2001 Pennsylvania Ave. NW Washington DC 20006). Operation of base station 100 in accordance with the preferred embodiment of the present invention occurs as follows: Uplink communication signals from multiple remote units (subscribers) are received at antenna 103. In the preferred embodiment of the present invention, uplink communication signals comprise CDMA communication signals transmitted from multiple remote units. Base station 100 determines or knows from previously-stored information, the carrier phase, PN spreading code, and data for each remote unit. In other words, base station 100 contains knowledge of each of the received signals in communication with base station 100 (e.g., $SIGNAL_1$, $SIGNAL_2$, . . . , $SIGNAL_N$) and thus subsequent decoding of received signals from a particular received composite signal can be achieved.

As described above, in a cellular environment, remote units not in communication with a serving base station contribute as much as half the noise energy to the serving base station. For example, remote unit 113 communicating with base station 150 via uplink communication signal 117 may contribute uncorrelated noise to the composite signal received at antenna 103 if remote unit 113 is transmitting within a frequency band utilized by receiver 123 of base station 100. Additionally, base station 150, communicating with remote unit 113 via downlink communication signal 115 may contribute uncorrelated noise to the composite signal received at antenna 103 if base stations 150–155 are transmitting within a frequency band utilized by receiver 123 of base station 100. Because of this, in the preferred embodiment of the present invention, base stations 150–155 supply noise canceling unit 121 with a list of potential interferers so that noise canceling unit 121 may cancel the uncorrelated noise from composite signal 120 and in an alternate embodiment, base stations 150–155 supply noise canceling unit 121 with despread transmissions of potential interferers so that noise canceling unit 121 may cancel the noise from composite signal 120. In particular, spread-spectrum composite signal 120, input into noise canceling unit 121, comprises other noise generated from remote unit 113 (and possibly from other remote units (not shown)). The output from noise canceling unit 121 is signal 130, representing spread-spectrum composite signal 120 "clean" of any interference contributed by remote unit 113 (and other remote units within non-serving cell sites).

In the preferred embodiment of the present invention, output signal 130 is then input into receiver 123 to undergo standard spread spectrum reception. Unlike prior-art methods of signal cancellation, in the preferred embodiment of the present invention noise canceling unit 121 utilizes data generated from other base stations in the production of signal 130. In particular, noise canceling unit 121 utilizes data supplied by base stations 150–155 to eliminate noise generated by remote unit 113, not in communication with base station 100. By canceling remote units' signals from composite signal 120 that are not in communication with base station 100, the decoding of remote unit signals in communication with base station 100 with greater accuracy is thereby made possible using the "subsequent" composite received signal 130 (i.e., after interference cancellation) without substantial contribution of noise generated in non-serving cell sites.

Figure 2:
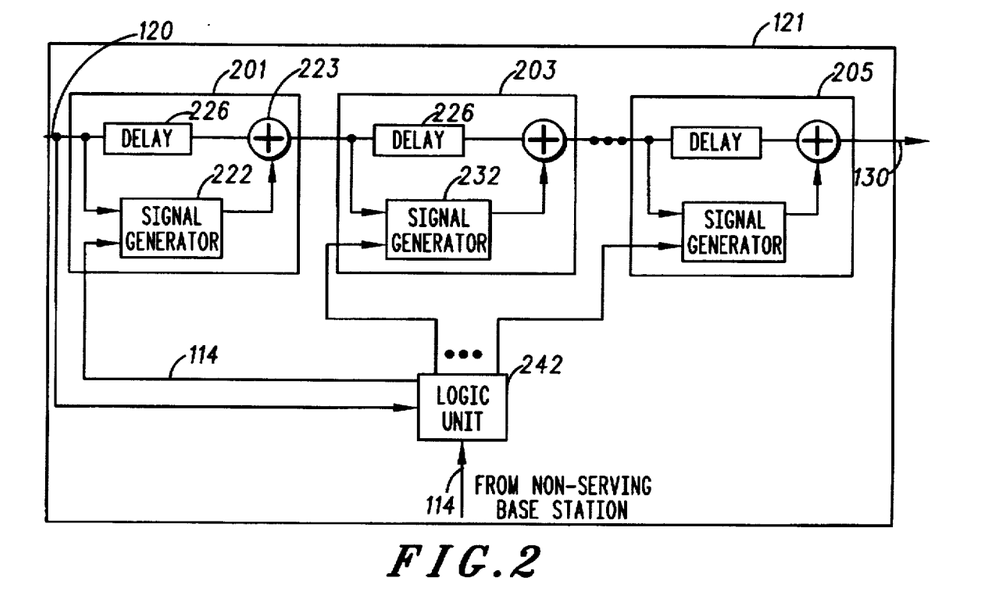
FIG. 2 generally depicts, in block diagram form, a noise canceling unit of FIG. 1 in accordance with the preferred embodiment of the present invention.

FIG. 2 generally depicts, in block diagram form, noise canceling unit 121 of FIG. 1 in accordance with the preferred embodiment of the present invention. Noise canceling unit 121 comprises logic unit 242, and a plurality of signal canceling units 201–205. In the preferred embodiment of the present invention, signal canceling units 201–205 comprise delay circuit 226, signal generator 222, and summer 223. Operation of generator 222 in accordance with the preferred embodiment of the present invention occurs as follows: Uplink communication signals from multiple remote units (subscribers) are received at logic unit 242 and cancellation unit 201. Logic unit 242 additionally receives from non-serving base station, information regarding remote units within the non serving cell coverage areas. In particular, logic unit 242 is supplied the carrier phase, PN spreading code, and data for remote units that are potential interferers. In the preferred embodiment of the present invention logic unit 242 supplies cancellation unit 201 with information regarding which signal to extract from signal 120. (Determination of which signal to extract from signal 120 is discussed below).

Continuing, spread-spectrum composite signal 120 is then input into canceling unit 201. As previously stated, spread-spectrum composite signal 120 contains noise generated by remote units existing within non-serving cell sites (i.e., remote units not in communication with serving base station 100). Canceling unit 201 splits composite signal 120 and inputs composite signal 120 into delay circuit 226 and signal generator 222. In the preferred embodiment of the present invention time delay of delay circuit 226 is set to compensate for the signal delay through signal generator 222. Output from signal generator 222 is cancellation signal 224, the generation of which is described. below. Cancellation signal 224 is then subtracted, via summing node 223, from spread-spectrum composite signal 120 so that any interference contributed by a chosen remote unit (e.g., remote unit 113) is substantially eliminated. Resulting signal 230 represents spread-spectrum composite signal 120 "clean" of any interference contributed by the chosen remote unit's signal. In the preferred embodiment of the present invention, output signal 230 is then input into second canceling unit 203 to undergo substantially the same signal cancellation procedure, except that subsequent processing by canceling units 203–205 will remove interference contributed by other transmitted remote unit signals (e.g., other remote units (not shown) in non serving cell sites).

In the preferred embodiment of the present invention cancellation signal 224 is improved by canceling signals representative of the largest interferers within non-serving base stations prior to using cancellation signals from lesser interferers within non-serving base stations. In other words, signal generator 222 (existing within canceling unit 201 of FIG. 2) will utilize the most reliable signal emanating from non-serving base stations 150–155, while generator 232 (existing within canceling unit 203 of FIG. 2) will utilize the second most reliable signal emanating from non-serving base stations 150–155. (Note that to canceling unit 203 input signal 230 is clean from the most reliable signal emanating from non-serving base stations 150–155). In order to determine the order of cancellation, composite signal 120 is input into logic unit 242. Logic unit 242 despreads signals emanating from non-serving base stations 150–155 from composite signal 120 and rank orders each signal by received signal strength. (Note that logic unit 242 is supplied with a list of potential interferers emanating from non-serving base stations via input 114). In the preferred embodiment of the present invention, logic unit 242 rank orders each signal by bit energy per noise density (i.e., $E_b/N_o$, which is defined as the ratio of energy per information-bit to noise-spectral density) associated with each received signal to identify a remote unit having the most reliable signal non communicating with the serving base station. Logic unit 242 outputs the appropriate signal to decode to each signal generator within noise canceling unit 121.

Figure 3:
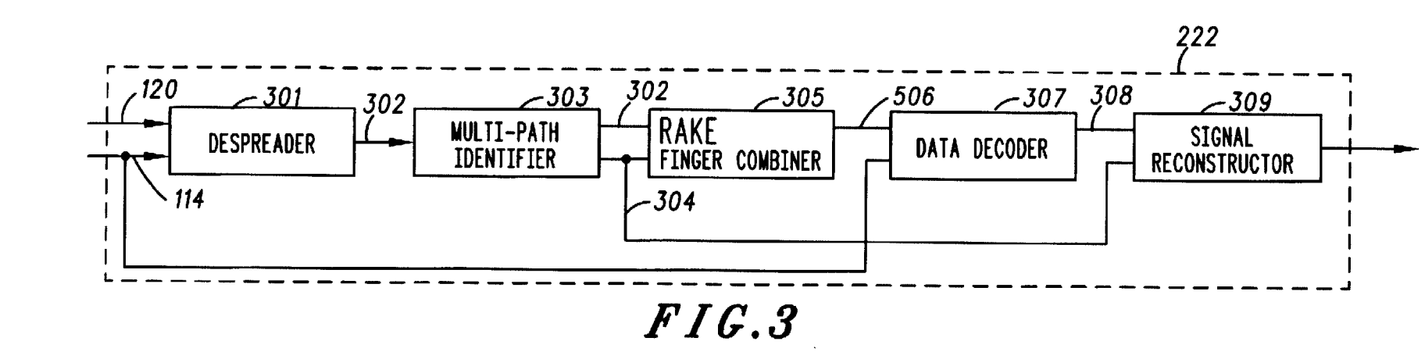
FIG. 3 generally depicts, in block diagram form, a signal generator of FIG. 2 in accordance with the preferred embodiment of the present invention.

FIG. 3 generally depicts, in block diagram form, signal generator 222 of FIG. 2 in accordance with the preferred embodiment of the present invention. Signal generator 222 comprises despreader 301, multipath identifier 303, rake finger combiner 305, data decoder 307, and signal reconstructor 309. Operation of signal generator 222 occurs as follows: Composite signal 120 enters despreader 301. As mentioned above, composite signal 120 comprises a multiplicity of frequency and time overlapping coded (spread) signals each of which has undergone multipath scattering. Despreader 301 despreads composite signal 120 to form signal 302 comprising a multiplicity of despread QPSK signals representative of signals emanating from non-serving cell sites (i.e. non-serving base stations). In the preferred embodiment of the present invention signal 302 is formed by despreading composite signal 120 with the appropriate despreading code (PN Code) to strip the spreading code from composite signal 120. The appropriate despreading code is supplied to despreader by non serving base stations 150–155 through input signal 114.

Signal 302 is then input into multipath identifier 303. Multipath identifier 303 determines multipath characteristics for the interference signals, which arise from the correlation peaks of the various echoes. These multipath characteristics include, but are not limited to, time delays and respective amplitudes and phases between correlation peaks for each signal. For a general background on identification of multipath components in communication systems, reference is made to "Introduction to Spread-Spectrum Antimultipath Techniques and Their Application to Urban Digital Radio" by Turin, published in the Proceedings of the IEEE, Vol. 68, No. 3, March 1980. Multipath characteristics 304 are output from multipath identifier 303 (along with signal 302) and enter RAKE finger combiner 305. RAKE finger combiner 305 utilizes multipath characteristics 304 to combine multipath components of the interfering signals resulting in signal 306 which is a representation of signal 302 with "echoes" caused by multipath scattering. Signal 306 is output to data decoder 307 which extracts information related to a particular signal (e.g. uplink signal 117) from signal 306 and outputs this information as resulting signal 308. In other words, data decoder 307 receives signal 306, extracts information related to only one signal (in this case uplink signal 117) and outputs this information as resulting signal 308. In the preferred embodiment of the present invention logic unit 242 supplies data decoder 307 with information regarding which signal to extract from signal 306. (Determination of which signal to extract from signal 306 is discussed below).

Continuing, signal reconstructor 309 receives signal 308, along with multipath characteristics 304 (supplied by multipath identifier 303) and "reconstructs" signal 117 as originally received. (i.e., with echoes). In other words, signal reconstructor 309 recreates the "echoes" that originally existed in signal 117 and outputs the reconstructed signal as cancellation signal 224.

In the preferred embodiment of the present invention the accuracy of cancellation signal 224 is improved by utilizing cancellation signals representative of the most reliable transmitted signals emanating from non-serving base stations 150–155 prior to using cancellation signals from less reliable signals. In other words, generator 222 (existing within canceling unit 201 of FIG. 2) will utilize the most reliable signal, while signal generator 232 (existing within canceling unit 203 of FIG. 2) will utilize the second most reliable signal. (Note that to the second canceler the input signal is clean from uplink signal 117). In order to determine the order of cancellation, composite signal 120 is input into logic unit 242. Logic unit 242 despreads composite signal 120 and rank orders each signal received from non-serving base stations 150–155 by received signal strength. In the preferred embodiment of the present invention, logic unit 242 rank orders each signal by bit energy per noise density (i.e., $E_b/N_o$, which is defined as the ratio of energy per information-bit to noise-spectral density) associated with each received signal. Logic unit 242 outputs the appropriate signal to decode to each signal generator within noise canceling unit 121.

Figure 4:
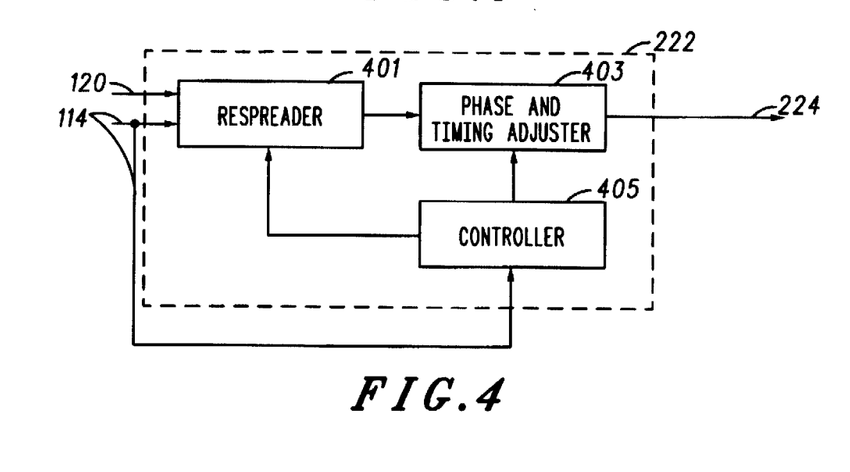
FIG. 4 generally depicts, in block diagram form, a signal generator of FIG. 2 in accordance with an alternate embodiment of the present invention.

FIG. 4 generally depicts, in block diagram form, signal generator 222 of FIG. 2 in accordance with an alternate embodiment of the present invention. In the alternate embodiment of the present invention, signal generator 222 is supplied with despread data transmitted from remote units not in communication with serving base station 100. In particular, signal generator 222 is supplied (via input 114) despread data representative of a transmission from remote unit 113 (and other remote units not in communication with base station 100), and utilizes the despread data in the manufacture of output signal 130.

Operation of signal generator 222 occurs as follows: Base station 150, communicating with remote unit 113, despreads remote unit 113's transmission and supplies the despread information to controller 405 and respreader 401 via input 114. In the alternate embodiment of the present invention, base station 150 also supplies information necessary for respreading the despread signal transmitted from remote unit 113. (i.e., base station 150 supplies a spreading code). Respreader 401 utilizes the information supplied by base station 150 to recreate (i.e., respread) the signal representative of remote unit 113's transmission. In other words, respreader 401 utilizes the appropriate spreading code (supplied by base station 150) and remote unit 113's despread transmission (also supplied by base station 150) to recreate (i.e., respread) remote unit 113's transmission as received by the serving base station 100. The recreated transmission is then passed to phase and timing adjuster 403.

In the alternate embodiment of the present invention, phase and timing adjuster 403 appropriately delays or advances the respread signal to accommodate for any propagation differences between remote unit 113 and base station 100. In particular, phase and timing adjuster 403 adjusts the phase and timing of the respread signal so that subsequent subtraction of the respread signal from composite signal 120 will appropriately remove interference contributed by remote unit 113. In the alternate embodiment of the present invention phase and timing adjuster 403 utilizes distance information between base station 150 and base station 100 to apply an appropriate phase and timing adjustment to the respread signal. Finally, the phase and timing adjusted respread signal is output as cancellation signal 224 to be subtracted from composite signal 120.

While the above description of the alternate embodiment utilizes a despread signal and spreading code supplied by non-serving base station 150 to create cancellation signal 224, in yet a further alternate embodiment of the present invention, composite signal 120 is additionally utilized in the manufacture of cancellation signal 224. In particular, respreader 401 comprises standard spread-spectrum receiving circuitry (not shown) to appropriately receive and despread composite signal 120. Information supplied by base station 150 (i.e. despread data and spreading codes) is utilized by respreader 401 to recreate signal 117 as received by non-serving base station 100.

Figure 5:
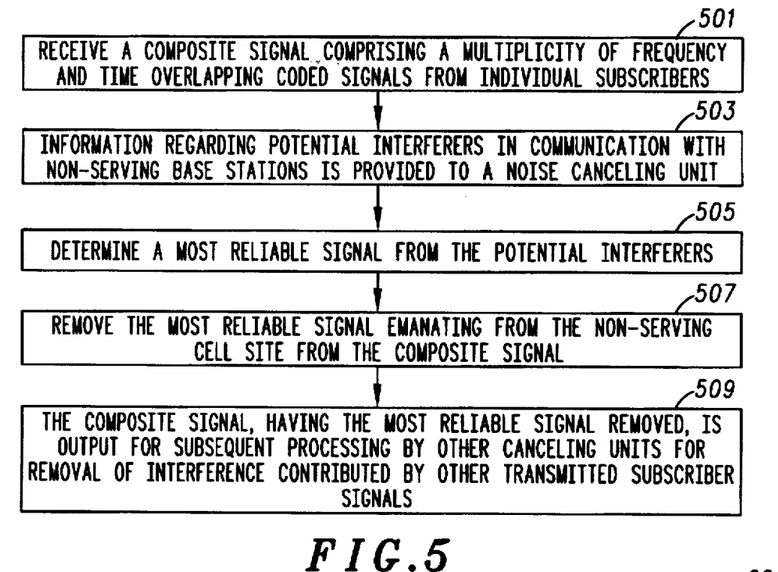
FIG. 5 is a flow chart illustrating operation of a noise canceling unit of FIG. 1 in accordance with the preferred embodiment of the present invention.

FIG. 5 is a flow chart illustrating operation of noise canceling unit 121 of FIG. 1 in accordance with the preferred embodiment of the present invention. The logic flow begins at step 501 where a signal generator (generator 222) receives a composite signal comprising a multiplicity of frequency and time overlapping coded signals from individual remote units each of which has undergone multipath scattering (signal 120). As discussed above, signal 120 additionally comprises interference caused by remote units in communication within non-serving base stations, each of which has undergone multipath scattering. Next, at step 503 information regarding potential interferers in communication with non-serving base stations is provided to noise canceling unit 121. In particular, in the preferred embodiment of the present invention, logic unit 242 is supplied with a list of potential interferers emanating from non-serving base stations via input 114. At step 505, a most reliable signal emanating from a non-serving cell site is determined, by logic unit 242. In particular, a most reliable signal is determined from the potential interferers. At step 507 the most reliable signal emanating from the non serving cell site is removed from composite signal 120. Finally, at step 509, composite signal 120, having the most reliable signal removed, is output for subsequent processing by other canceling units for removal of interference contributed by other transmitted remote unit signals (e.g., other remote units in non serving cell sites).

Figure 6:
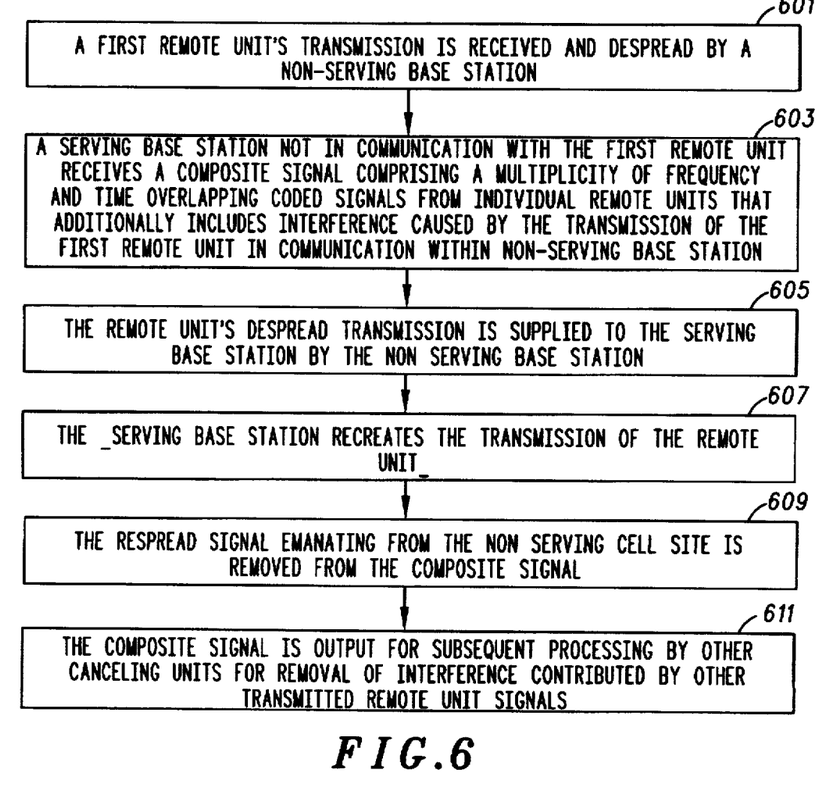
FIG. 6 is a flow chart illustrating operation of a noise canceling unit of FIG. 1 in accordance with the alternate embodiment of the present invention.

FIG. 6 is a flow chart illustrating operation of a noise canceling unit of FIG. 1 in accordance with the alternate embodiment of the present invention. The logic flow begins at step 501 where a first remote unit's transmission is received and despread by a non-serving base station. In particular, remote unit 113's transmission is received by non-serving base station 150 and appropriately despread. Next, at step 503, a serving base station not in communication with the first remote unit receives a composite signal comprising a multiplicity of frequency and time overlapping coded signals from individual remote units that additionally includes interference caused by the transmission of the first remote unit in communication within non-serving base station. In particular, serving base station 100 receives composite signal 120 containing frequency and time overlapping signals of remote units in communication with serving base station 100, with signal 120 additionally containing noise caused by the reception of signal 117. Next, at step 505 the remote unit's despread transmission is supplied to the serving base station by the non serving base station and the serving base station recreates the transmission of the remote unit (step 507). Next, at step 509, the respread signal emanating from the non serving cell site is removed from the composite signal (composite signal 120). Finally, at step 509, composite signal 120 is output for subsequent processing by other canceling units for removal of interference contributed by other transmitted remote unit signals (e.g., other remote units in non serving cell sites).

Figure 7:
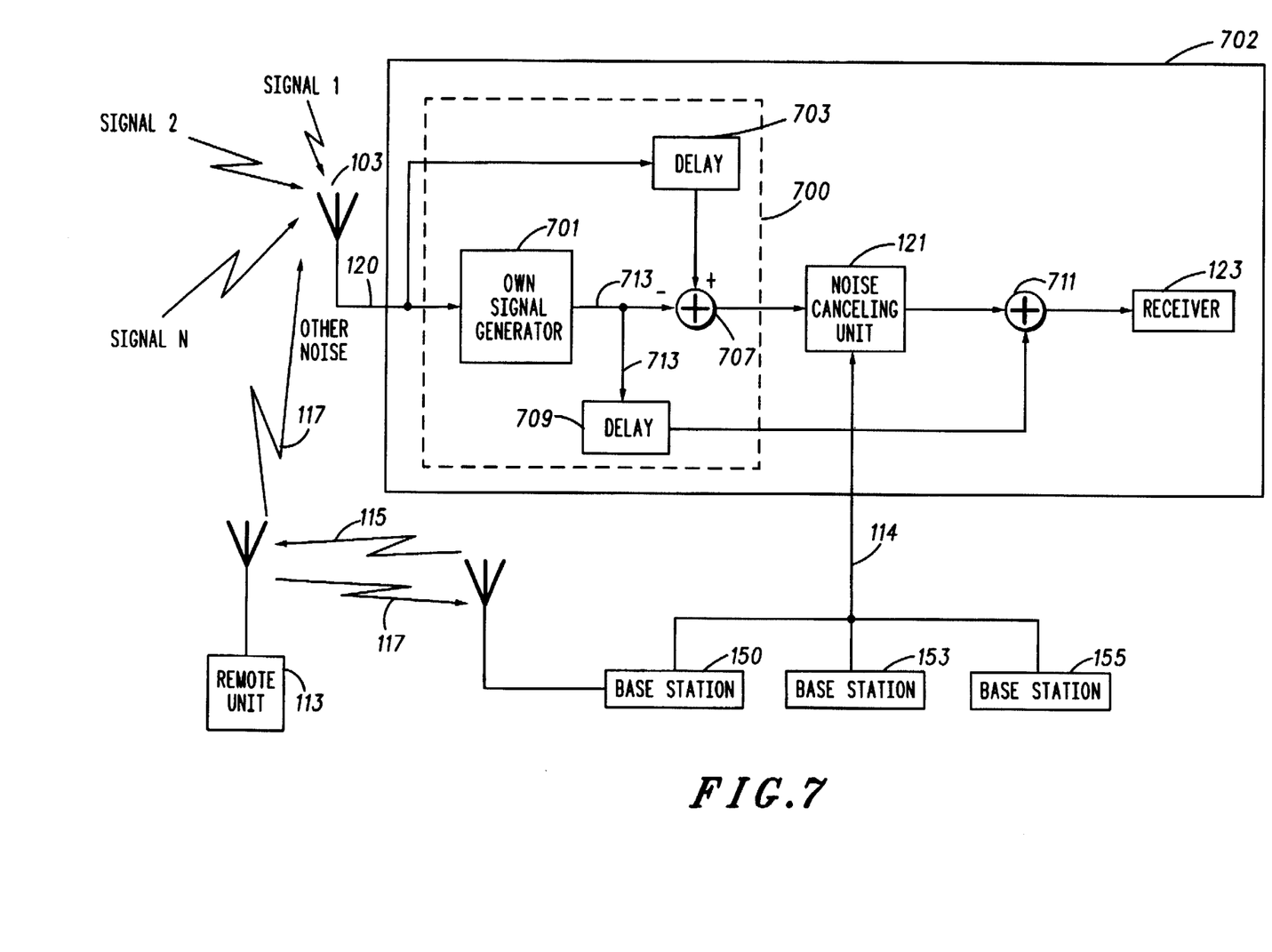
FIG. 7 generally depicts, in block diagram form, a base station which may beneficially implement interference cancellation in accordance with an alternative embodiment of the present invention.

FIG. 7 generally depicts, in block diagram form, base station which may beneficially implement interference cancellation in accordance with an alternative embodiment of the present invention. As shown in FIG. 7, own signal canceling unit 700, delay 709 and summers 707 and 711 are added to base station 100 of FIG. 1. Unlike the preferred embodiment, the alternate embodiment cancels signals from remote units in communication with serving base station 702 prior to canceling users not in communication with the serving base station. In particular, the cancellation of serving remote units is used when other noise canceling unit 121 is ineffective in estimating the amplitude and phase of signals not in communication with base station 100.

Operation of base station 702 in accordance with the alternate embodiment of the present invention as follows. Own cell and other cell signals enter antenna 103 and own signal canceling unit 700 as composite signal 120. Composite signal 120 enters own signal generators 701 which synthesize an estimate of each of the own signals over a short interval (e.g., one symbol or a small group of symbols). Signal generator 701 utilizes prior-art interference cancellation techniques to cancel interference from remote units in communication with serving base station 702. For example, as described in U.S. Pat. No. (Ser. No. 08/763,160) METHOD AND APPARATUS FOR CANCELING INTERFERENCE IN A SPREAD-SPECTRUM COMMUNICATION SYSTEM, by Kotzin et al., and incorporated by reference herein, signal 713 exiting signal generator 701 will represent composite signal 120 free from interference caused by remote units in communication with base station 702. Signal 713 is subtracted from composite signal 120 which has been delayed by delay circuitry 703 (designed to match the delay in own signal generators 701). At this point, the contribution of the own cell signals has been greatly reduced so that the operation of other signal canceling unit may proceed with much lower noise conditions.

The output of summer 707 is input to other signal canceling unit 121. Sum signal 713 also inputs delay 709 which is designed to match the delay in other signal canceling unit 121. The output of other signal canceling unit 121 is summed with the output of delay 709 in summer 711 thereby returning the own cell signals to the same condition as they were in composite signal 120 but without the noise contribution of the other cell signals. In this way, any errors introduced by own signal canceling unit 700 are substantially removed. By firstly removing signals from remote units within communication with serving base station 702 prior to canceling noise from remote units not in communication with base station 702, a better estimate of remote units' signals not in communication with base station 702 can be achieved.

While the invention has been particularly shown and described with reference to a particular embodiment, it will be understood by those skilled in the art that various changes in form and details may be made therein without departing from the spirit and scope of the invention. For example, base station 150, communicating with remote unit 113 via downlink communication signal 115 may contribute uncorrelated noise to the composite signal received at antenna 103 if base stations 150–155 are transmitting within a frequency band utilized by receiver 123 of base station 100. Therefore, canceling unit 121 may be supplied with information regarding downlink communication signal 115 in order to remove all noise attributed from downlink signal 115 from composite signal 120. It is the intent of the inventors that various modifications come within the scope of the following claims.

What we claim is:

1. A method of canceling noise in a spread-spectrum communication system, the method comprising the steps of:

receiving a composite signal comprising a multiplicity of frequency and time overlapping coded signals from remote units in communication with a serving base station, the composite signal additionally comprising a signal from a remote unit not in communication with the serving base station;

receiving information from a non-serving base station regarding the signal from the remote unit not in communication with the serving base station, wherein the information received from the non-serving base station comprises a despread transmission from the remote unit not in communication with the serving base station;

producing a cancellation signal representative of the signal from the remote unit not in communication with the serving base station based on the information received from the non-serving base station; and producing a composite signal substantially free of the signal transmitted from the remote unit not in communication with the serving base station based on the cancellation signal.

2. The method of claim 1 further comprising the step of processing the composite signal substantially free of the signal transmitted from the remote unit by a receiver to extract information regarding the remote units in communication with the serving base station.

3. The method of claim 1 wherein the step of producing the cancellation signal comprises the step of producing a cancellation signal that includes multipath scattering components of the signal received from the remote unit.

4. The method of claim 3 wherein the step of producing the cancellation signal comprises the step of identifying characteristics of the signal received from the remote unit from a group consisting of time delays, respective amplitudes, and phases between correlation peaks and producing the cancellation signal based on the identification.

5. The method of claim 1 wherein the step of receiving a composite signal comprises the step of receiving a Code Division Multiple Access (CDMA) composite signal.

6. A method of canceling signals in a spread-spectrum communication system, the method comprising the steps of:

receiving a composite signal comprising a multiplicity of frequency and time overlapping coded signals from remote units in communication with a serving base station, the composite signal additionally comprising signals from remote units not in communication with the serving base station;

receiving information from a non-serving base station regarding the signals from the remote units not in communication with the serving base station wherein the information received from the non-serving base station comprises despread transmissions from the remote units not in communication with the serving base station;

determining from the information, an identity of a first remote unit not in communication with the serving base station, the first remote unit having a most reliable signal;

producing a cancellation signal representative of a signal transmitted from the first remote unit based on the determination; and producing a second signal based on the cancellation signal, the second signal comprising the composite signal substantially free of the signal transmitted from the first remote unit.

7. The method of claim 6 wherein the step of determining information from the non-serving base stations representative of the first remote unit having the most reliable signal comprises extracting information from the non-serving base stations representative of the first remote unit having a highest ratio of energy per information-bit to noise-spectral density ($E_b/N_0$).

8. The method of claim 6 wherein the step of receiving a composite signal comprises the step of receiving a Code Division Multiple Access (CDMA) composite signal.

9. A method of canceling noise in a spread-spectrum communication system, the method comprising the steps of:

receiving a composite signal in a first base station which is a non-serving base station, the composite signal comprising a multiplicity of frequency and time overlapping coded signals from remote units in communication with the first base station, the composite signal additionally comprising a signal transmitted from a remote unit in communication with a second base station which is a non-serving base station;

receiving by the second base station the signal transmitted from the remote unit;

receiving information from the second base station regarding the signal transmitted from the remote unit wherein the information received from the second base station comprises a despread transmission from the remote unit not in communication with the serving base station; and producing a cancellation signal representative of the signal transmitted from the remote unit not in communication with the serving base station based on the information received from the non-serving base station.

10. The method of claim 9 wherein the step of producing a cancellation signal comprises the steps of respreading the despread signal to form the cancellation signal.

11. An apparatus comprising a noise canceling unit having as an input a composite signal comprising a multiplicity of frequency and time overlapping coded signals from remote units in communication with a serving base station, the composite signal additionally comprising a signal from a remote unit not in communication with the serving base station, the noise canceling unit additionally having as an input information from a non-serving base station regarding the signal from the remote unit not in communication with the serving base station, wherein the information input from the non-serving base station comprises a despread transmission from the remote unit not in communication with the serving base station, the noise canceling unit outputting composite signal substantially free of the signal transmitted from the remote unit not in communication with the serving base station.

12. The apparatus of claim 11 wherein the noise canceling unit comprises:

a despreader having as an input a composite signal and outputting a plurality of despread signals;

a multipath identifier having as an input the plurality of despread signals, and outputting multipath characteristics of the plurality of despread signals; and a RAKE finger combiner having as an input the plurality of despread signals and the multipath characteristics of the plurality of despread signals, and outputting a first signal which is a representative of the composite signal without multipath scattering components.

13. The apparatus of claim 12 wherein the noise canceling unit further comprises:

a data decoder having as an input, the first signal and outputting information related to an individual signal;

a signal reconstructor having as inputs, information related to the individual signal and the multipath components, and outputting the individual signal as originally received, wherein the individual signal as originally received contains multipath scattering components; and an inverse summer having as inputs the individual signal as originally received and the composite signal and outputting the composite signal substantially free of any interference contributed by the individual signal.

14. The apparatus of claim 11 further comprising an ordering generator having as an input the composite signal, and outputting a most reliable signal.

* * * * *